United States Patent
Zhang et al.

(10) Patent No.: US 9,645,602 B2
(45) Date of Patent: May 9, 2017

(54) FREQUENCY SENSOR FOR SIDE-CHANNEL ATTACK

(71) Applicant: QUALCOMM Incorporated, San Diego, CA (US)

(72) Inventors: Junmou Zhang, San Diego, CA (US); Nan Chen, San Diego, CA (US); Guoan Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,221

(22) Filed: Sep. 23, 2015

(65) Prior Publication Data
US 2017/0083040 A1 Mar. 23, 2017

(51) Int. Cl.
*G06F 1/08* (2006.01)
*G06F 11/00* (2006.01)
*G06F 21/55* (2013.01)

(52) U.S. Cl.
CPC ............ *G06F 1/08* (2013.01); *G06F 21/554* (2013.01); *G06F 2221/034* (2013.01)

(58) Field of Classification Search
CPC ..... G06F 1/08; G06F 21/554; G06F 2221/034
See application file for complete search history.

(56) References Cited

U.S. PATENT DOCUMENTS

| | | | | |
|---|---|---|---|---|
| 5,614,868 A * | 3/1997 | Nielson | ................... | G06F 7/605 327/158 |
| 5,742,799 A * | 4/1998 | Alexander | ................ | G06F 1/12 713/401 |
| 5,761,216 A * | 6/1998 | Sotome | ............ | G01R 31/31813 714/738 |
| 6,233,629 B1 * | 5/2001 | Castellano | ................ | G06F 5/10 710/29 |
| 6,333,646 B1 * | 12/2001 | Tsuzuki | ................. | G01R 31/30 327/40 |
| 7,043,654 B2 | 5/2006 | Khondker et al. | | |
| 7,639,048 B2 | 12/2009 | Lin | | |
| 7,650,551 B2 | 1/2010 | Flautner et al. | | |
| 7,683,683 B1 | 3/2010 | Majumder et al. | | |
| 7,936,200 B2 | 5/2011 | Abouda et al. | | |
| 2005/0156647 A1 | 7/2005 | Kim | | |
| 2009/0039867 A1 | 2/2009 | Saint-Laurent et al. | | |
| 2011/0128055 A1 | 6/2011 | Pelgrom et al. | | |
| 2011/0260749 A1 | 10/2011 | Deas et al. | | |

OTHER PUBLICATIONS

International Search Report and Written Opinion—PCT/US2016/050662—ISA/EPO—Dec. 16, 2016.

\* cited by examiner

*Primary Examiner* — Mark Connolly
(74) *Attorney, Agent, or Firm* — Arent Fox, LLP

(57) ABSTRACT

A method, an apparatus, and a computer program product for wireless communication are provided. The apparatus may be used for detecting an incorrect clock frequency. In one example, the apparatus includes a first circuit configured to compare a clock signal period to a delay period. Additionally, in one example, the apparatus includes a second circuit configured to output a first signal. The period of the first signal may be double the clock signal period when the clock signal period is greater than the delay period. The apparatus may, in one example, also include a third circuit configured to output a second signal. The period of the second signal may be greater than double the clock signal period when the clock signal period is greater than the delay period.

29 Claims, 18 Drawing Sheets

FREQUENCY SENSOR FOR SIDE-CHANNEL ATTACK

BACKGROUND

Field

The present disclosure relates generally to cryptographic systems, and more particularly, to a frequency sensor that may be used to attempt to determine if a side-channel attack on the cryptographic attack is occurring.

Background

FIG. 1 is a diagram illustrating an example cryptographic system 100. The cryptographic system 100 may include a cryptographic algorithm for encrypting data, decrypting data, or both. For example, the cryptographic system 100 may generally take inputs 104 and encrypt those inputs to produce an encrypted output 106. Encryption is the process of encoding messages or information in such a way that, if the encryption is successful, only authorized parties are able to read the encrypted message. Encryption may deny a message's content from those who may intercept a message.

When the cryptographic system 100 is encrypting data, the inputs 104 may be referred to as plaintext. The inputs 104 to the cryptographic system 100, when encrypting are generally unencrypted data. The data has generally not been previously encrypted. However, in some cases, a system may further encrypt a previously encrypted message. The inputs 104, e.g., plaintext, may be encrypted using the encryption algorithm 102 that is part of the cryptographic system 100. The cryptographic system 100 may generate the output 106. The output 106 of the cryptographic system 102 may be an encrypted version of the input 104. The encrypted output 106 may be referred to as "ciphertext," e.g., when the cryptographic system is encrypting data. Generally, if the encryption scheme is successful, the encrypted output or ciphertext may only be read if decrypted.

Conversely, when the cryptographic system 100 is decrypting data, the inputs 104 may be referred to as encrypted data or ciphertext. The inputs 104 to the cryptographic system 100, when decrypting are generally plain unencrypted data, i.e., plaintext. The data may generally not have been encrypted multiple times. However, in some cases, a system may further encrypt a message such that the data is encrypted multiple times. The inputs 104, e.g., ciphertext, may be decrypted using the encryption algorithm 102 that is part of the cryptographic system 100. The cryptographic system 100 may generate the output 106. The output 106 of the cryptographic system 102 may be a decrypted version of the input 104.

Depending on the encryption scheme, a key may be needed to convert the encrypted output or ciphertext back to the plaintext. The key may be a random or pseudo random sequence of bits used to encrypt the data, decrypt the data, or both. An authorized recipient, e.g., a recipient rightfully having the proper key, may generally be able to decrypt the message with the key. Those not authorized to access the encrypted information may not be provided with the proper key and generally may not be able to decrypt the information or may not be able to decrypt the information without dedicating a large number of resources to breaking the encryption.

Generally, encryption systems are used to protect sensitive information. This sensitive information may include voice communication and data communication. The data may be sensitive data such as banking records, PIN numbers, social security numbers, and other personal information. Data having monetary value, such as music or videos may also be encrypted so that the music or videos are only accessible to those who may have purchased such content. (This assumes that the encryption for this content has not been broken.)

In some instances, people may use various side-channel attacks on the cryptographic system 100 in an attempt to gain access to information on the cryptographic system 100, such as the key used to encrypt and decrypt data. In cryptography, a side-channel attack is any attack based on information gained from the physical implementation of a cryptosystem. The side-channel attack may modify various conditions under which the cryptographic system operates to try to gain information, such as the key being used. A side channel attack may be contrasted with a brute attack. A brute-force attack is a cryptanalytic attack that may, in theory, be used against any encrypted data having a finite cryptographic key. The brute force attack may try multiple keys in an attempt to decrypt encrypted data. For example, the brute-force attack may systematically go through the keys. In some instances, knowledge of the data being encrypted may be used to eliminate some number of potential keys in a brute-force attack.

Examples of side-channel attacks include, but are not necessarily limited to attacks manipulating timing, voltage, temperature, and clock inputs, to name a few. When completing a side channel attack, the attacker may monitor timing, outputs, fault outputs, power consumption, electromagnetic emissions, or other outputs of the cryptographic system 102 under attack.

It may be useful to monitor for one or more aspects of a side-channel attack.

SUMMARY

In an aspect of the disclosure, a method, a computer program product, and an apparatus are provided. A method, an apparatus, and a computer program product for wireless communication are provided. The apparatus may be used for detecting an incorrect clock frequency. In one example, the apparatus includes a first circuit configured to compare a clock signal period to a delay period. Additionally, in one example, the apparatus includes a second circuit configured to output a first signal. The period of the first signal may be double the clock signal period when the clock signal period is greater than the delay period. The apparatus may, in one example, also include a third circuit configured to output a second signal. The period of the second signal may be smaller than the clock signal period when the clock signal period is smaller than the delay period.

DETAILED DESCRIPTION

Figure 1:
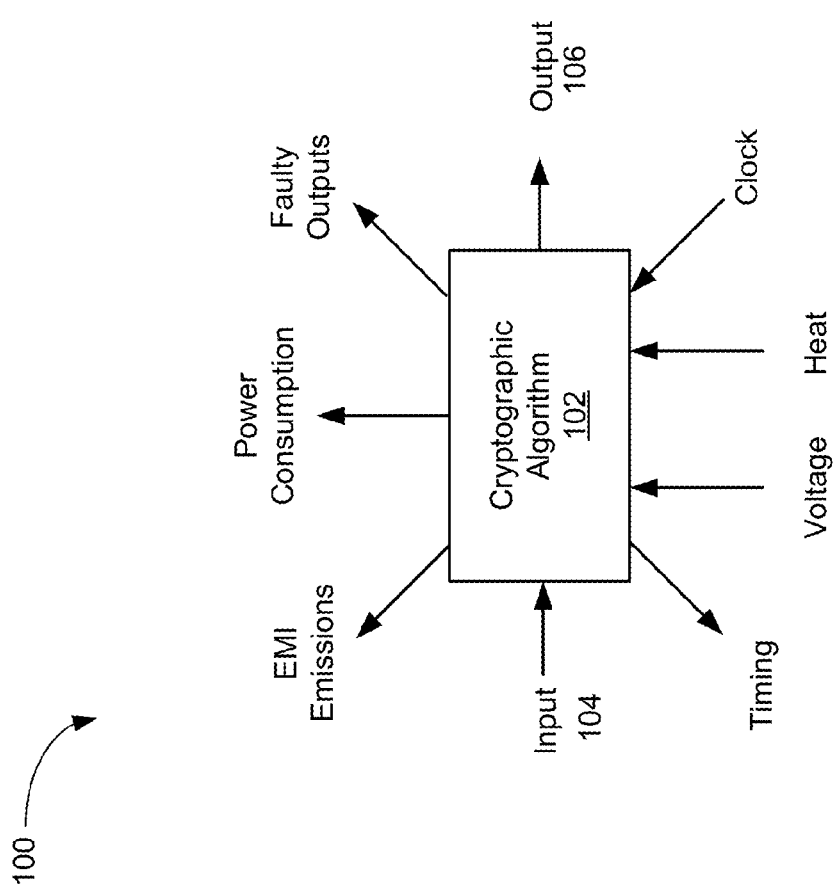
FIG. 1 is a diagram illustrating an example cryptographic system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Generally, the systems, methods, and devices described herein may be applied in an attempt to detect side-channel attacks where one or more clock frequencies are changed in an attempt to gain sensitive information about the operation of the cryptographic system 102. For example, someone attempting a side-channel attack may attempt to increase or decrease the clock frequency of one or more blocks used by cryptographic system 102.

Figure 2:
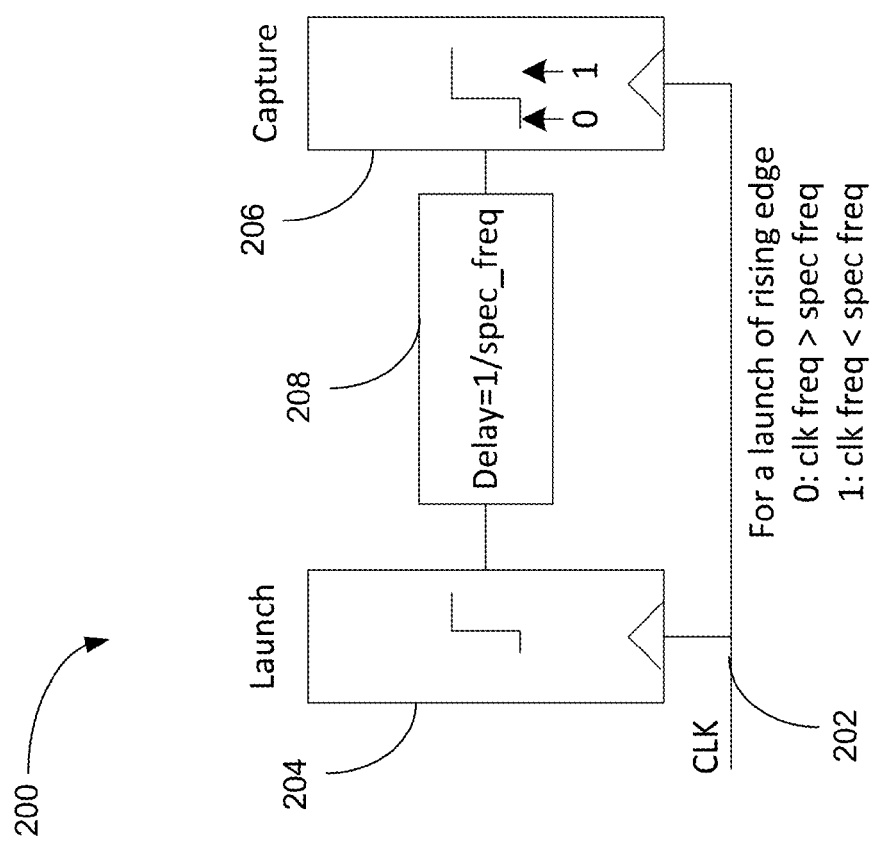
FIG. 2 is a diagram illustrating an example implementation of a frequency sensor that may be used to determine if some aspects of a side-channel attack are occurring.

FIG. 2 is a diagram illustrating an example implementation of a frequency sensor 200 that may be used to determine if some aspects of a side-channel attack are occurring. The frequency sensor 200 in the illustrated example is clocked using clock signal 202. Additionally, clock signal 202 is the signal being checked by the frequency sensor 200 to determine if it is operating at the correct clock frequency.

The frequency sensor 200 includes a launch flip-flop 204 and a capture flip-flop 206. Additionally, the frequency sensor 200 includes a delay element 208. The delay value or amount of delay in the delay element 208 may be set to a specified length of time based on the frequency of the clock signal 202. For example, the delay of delay element 208 may be one-half the clock period of clock signal 202.

In some examples, the specified frequency of the clock signal 202 may be the frequency used in a cryptographic system such as the cryptographic system 102 of FIG. 1. If the cryptographic system uses more than one clock, a different frequency sensor may be used for each clock in the cryptographic system.

Assuming the cryptographic system 102 of FIG. 1 is a single clock, a single frequency sensor 200, as illustrated in FIG. 2, may be used to monitor that clock. The delay 208 may be set based on the intended frequency of the clock signal. More particularly, the delay may be approximately equal to the period of the clock signal (1/specified frequency of the clock). FIG. 2 illustrates the two possible outputs at the capture flip-flop, a logic 0 and a logic 1. The output of the frequency sensor 200 may be based on the timing of the delay of the delay element 208 versus the timing of clock signal 202. If the signal at the capture flip-flop 206 is a 0 on the rising edge of the clock signal 202 then the actual clock frequency of the cryptographic system is greater than the specified frequency for the cryptographic system 102. If the signal at the capture flip-flop 206 is a 1 then the actual clock frequency 202 of the cryptographic system is greater than the specified frequency for the cryptographic system 102.

Figure 4:
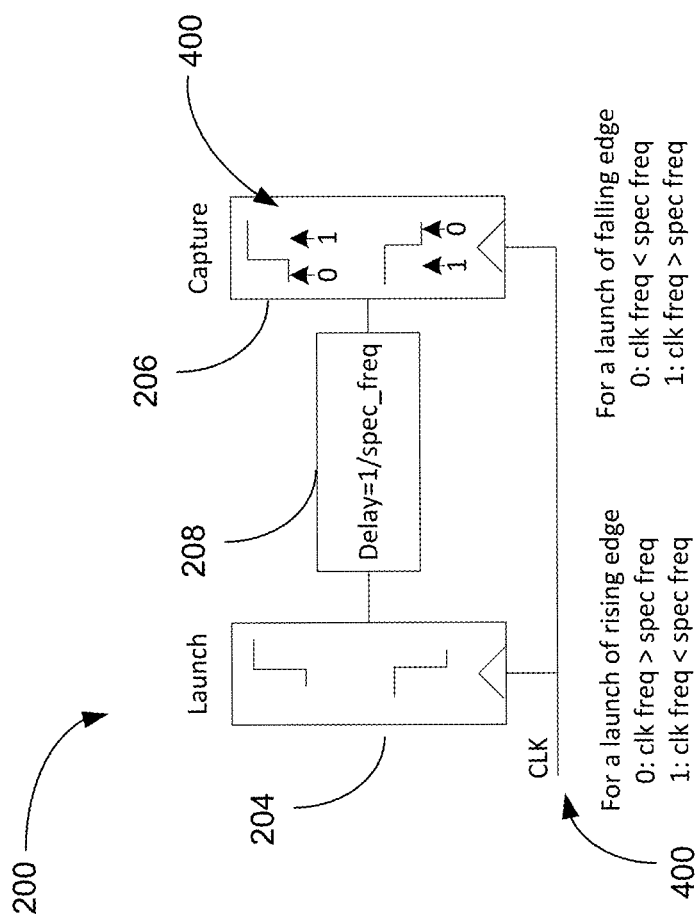
FIG. 4 illustrates a diagram including the frequency sensor of FIG. 2, which may generate a false negative when the clock frequency is greater than two times the specified frequency.
Figure 5:
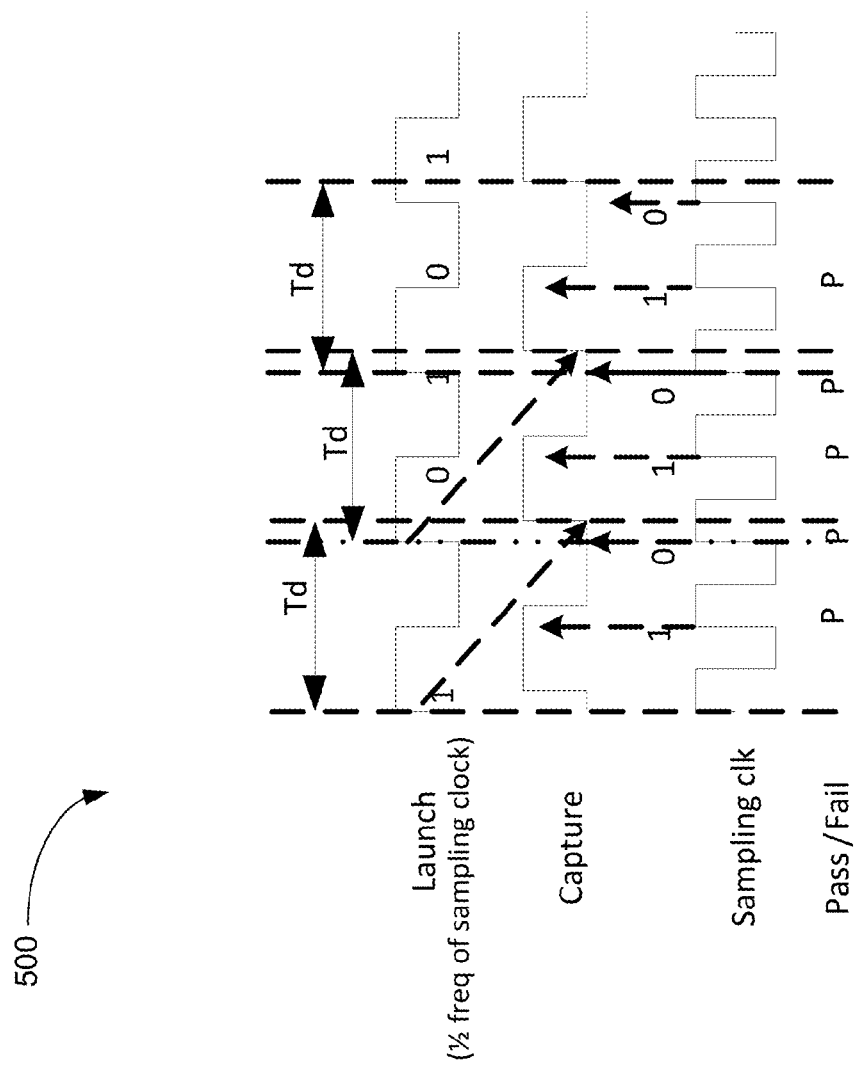
FIG. 5 is a timing diagram illustrating an example of false negative signal timing for the frequency sensor of FIG. 2 and FIG. 4.

Contrary to the discussion above, however, the frequency sensor 200 may produce a false negative if the frequency is more than double the intended frequency or, more particularly, if the frequency is more than double the maximum intended frequency, as is discussed in more detail with respect to FIGS. 4-5.

Figure 3:
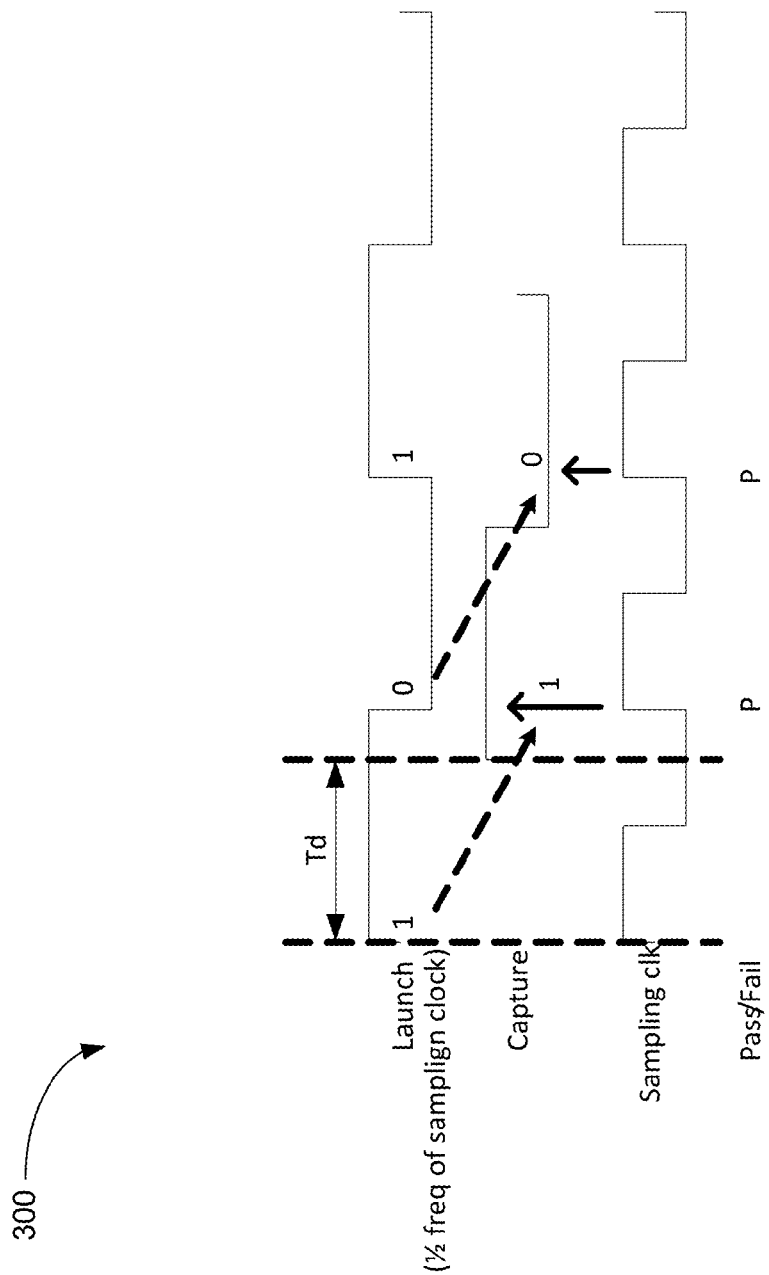
FIG. 3 is a timing diagram illustrating an example of signal timing for a frequency sensor illustrated in FIG. 2.

FIG. 3 is a timing diagram 300 illustrating an example of signal timing for the frequency sensor 200 of FIG. 2. The timing diagram 300 illustrates an output signal from the launch flip-flop 204, a capture value at the input to the capture flip-flop 206, and a sampling clock, e.g., clock signal 202 of FIG. 2. The input to the capture flip-flop 206 is delay by the delay circuit 208. In the example illustrated in the timing diagram 300 the time period of the sample clock (e.g., clock signal 202 of FIG. 2) is longer than the delay period Td. The delay of the delay circuit 208, Td, is illustrated in FIG. 3.

The timing diagram 300 generally illustrates how the frequency sensor 200 of FIG. 2 is intended to operate with two signals, one of which is the sampling clock, which is also the clock being monitored, and the other one of which is a signal generated from the sampling clock having a frequency of one-half the sampling clock frequency. The timing diagram 300 illustrates results with the frequency sensor 200 indicating a pass, "P," in two example instances. A pass may generally indicate that the frequency of the sampling clock is within a desired frequency range. FIG. 3 illustrates an example with the clock frequency lower than the specified frequency.

As illustrated in FIG. 3, the clock period is slightly greater than the delay, Td. Accordingly, in the illustrated example of FIG. 3, the timing diagram 300 illustrates that the capture flip-flop 206 clocks in a logical "1" on the rising edge of the clock when the delayed output through delay circuit 208 from the output of launch flip-flop 202 is a logical "1" immediately prior to the rising clock edge.

Additionally, in the illustrated example of FIG. 3, the timing diagram 300 illustrates that the capture flip-flop 206 clocks in a logical "0" on the rising edge of the clock when the delayed output through delay circuit 208 from the output of launch flip-flop 202 is a logical "0" immediately prior to the rising clock edge. Accordingly, the circuit of FIG. 3 generally produces a "correct" result if the clock frequency is lower than the specified frequency. The circuit of FIG. 3 however, it may generate an "incorrect" result or false negative when the clock frequency is greater than two times the specified frequency as will be discussed below with respect to FIGS. 4-5.

FIG. 4 illustrates a diagram including the frequency sensor 200 of FIG. 2, which may generate an "incorrect" result or false negative when the clock frequency is greater than two times the specified frequency. The frequency sensor 200 in the illustrated example of FIG. 4 is clocked using clock signal 400, which is at least two times the desired clock frequency, e.g., the specified frequency. In other words, it is likely that someone is attempting a side-channel attack by increasing the clock frequency of the clock signal of an encryption device. The clock signal 400 is the signal being checked by the frequency sensor 200 to determine if it is operating at the correct clock frequency.

As discussed above, the frequency sensor 200 includes the launch flip-flop 204 and the capture flip-flop 206. The launch flip-flop 204 sends out an output which toggles at one-half of the clock frequency. Additionally, the frequency sensor 200 includes the delay element 208. The delay value or amount of delay in the delay element 208 may be set to a specified length of time based on the desired frequency of the clock signal (e.g., clock signal 202 of FIG. 2). For the example of FIG. 4, however, the clock signal 400 has an at least two times higher clock frequency than the desired clock signal. Accordingly, the delay of delay element 208 may be longer than the clock period, e.g., double the clock period of clock signal 400. When the rising edge is used, a logic "0" indicates that the clock frequency is greater than the specified frequency. Additionally, when the rising edge is used, a logic "1" indicates that the clock frequency is less than the specified frequency. When the falling edge is used, a logic "0" indicates that the clock frequency is less than the specified frequency. Additionally, when the falling edge is used, a logic "1" indicates that the frequency is greater than the specified frequency. However, these indications may be incorrect when the clock frequency is greater than two times the desired frequency, as is illustrated in the timing diagram of FIG. 5.

FIG. 5 is a timing diagram 500 illustrating an example of false negative signal timing for the frequency sensor 200 of FIG. 2 and FIG. 4. The timing diagram 500 illustrates an output signal from the launch flip-flop 204, a capture value at the input to the capture flip-flop 206, and a sampling clock, e.g., clock signal 400 of FIG. 4, which has a clock frequency that is greater than two times the desired clock frequency. The input to the capture flip-flop 206 is delay by the delay circuit 208. In the example illustrated in the timing diagram 500 the time period of the sample clock (e.g., clock signal 400 of FIG. 4) is shorter than half of the delay period Td. The delay of the delay circuit 208, Td, is illustrated in FIG. 5.

The timing diagram 500 generally illustrates how the frequency sensor 200 of FIGS. 2 and 4 operate with respect to clock signals that are twice the maximum intended clock frequency. The timing diagram 500 illustrates results with the frequency sensor 200 indicating a pass, "P," in five example instances even though the frequency is too high. A pass is supposed to generally indicate that the frequency of the sampling clock is within a desired frequency range. For example, the example of FIG. 3 illustrates an example when the clock frequency is approximately equal to the specified frequency. In the example of FIG. 5, however, the clock frequency is about two times specified frequency. Yet the frequency sensor 200 indicating a pass, "P" at multiple instances. The pass is indicated because the timing is such that the logical values appear to be correct despite the fact that the clock is operating at too high a frequency.

As illustrated in FIG. 5, the clock period is less than the delay, Td. Accordingly, in the illustrated example of FIG. 5, the timing diagram 500 illustrates that the capture flip-flop 206 clocks in a logical "1" on the rising edge of the clock even though the output of launch flip-flop 202 is a logical "1" immediately prior to the rising clock edge. The delayed output through delay circuit 208 is too long to correctly show the recent output of the launch flip-flop 202. Similarly, the capture flip-flop 206 clocks in a logical "0" on the rising edge of the clock even though the output of launch flip-flop 202 is not a logical "0" immediately prior to the rising clock edge. Again, the delayed output through delay circuit 208 is too long to correctly show the recent output of the launch flip-flop 202.

Accordingly, the circuit of FIG. 4 generally produces an incorrect result because the frequency is too high, but multiple pass results are provided as an output. Accordingly, the frequency sensor 200 may generate an "incorrect" result or false negative when the clock frequency is greater than two times the specified frequency.

Figure 6:
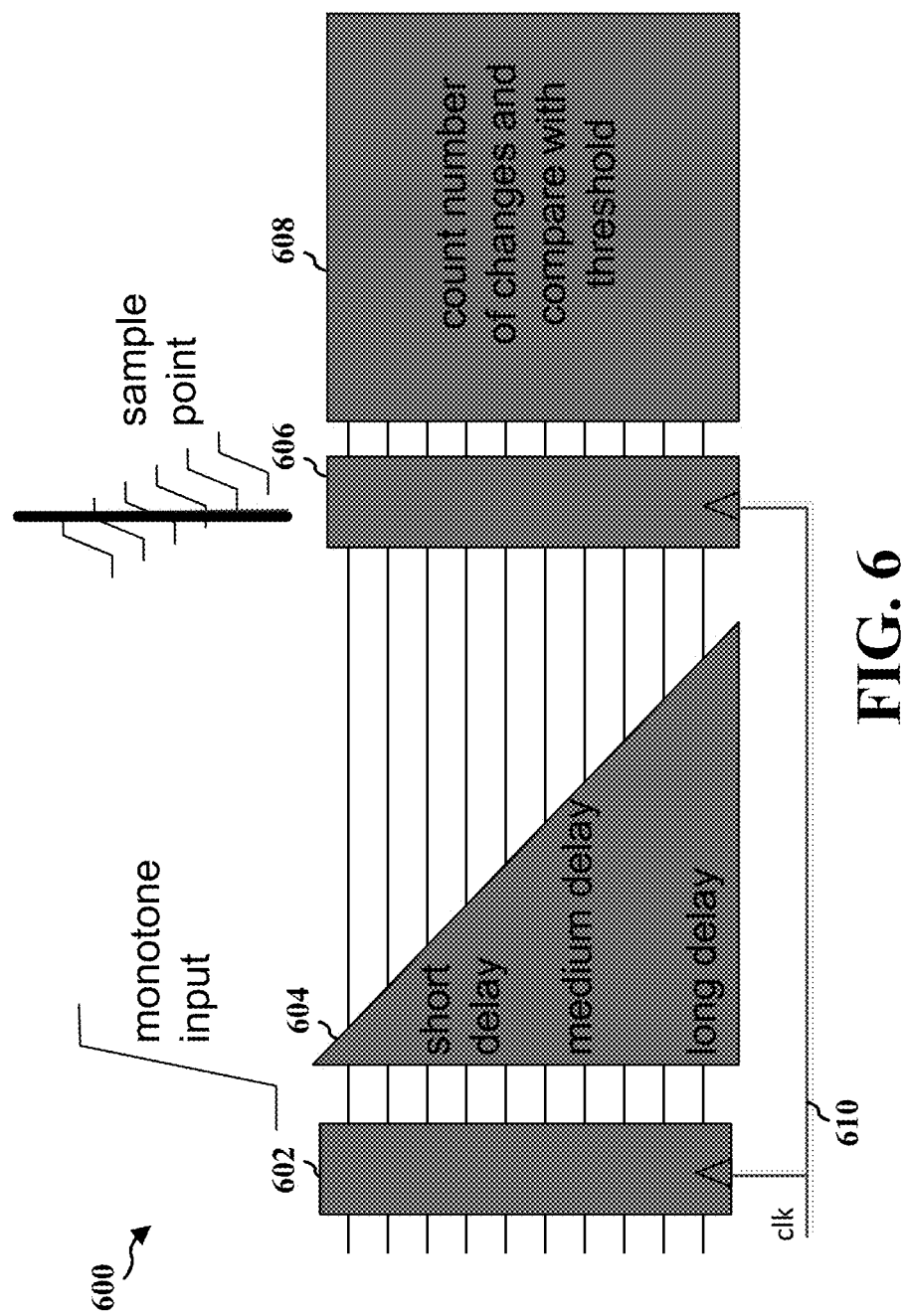
FIG. 6 is a block diagram illustrating an example system that may be used as a frequency sensor.

FIG. 6 is a block diagram illustrating an example system that may be used as a frequency sensor 600. The example frequency sensor 600 includes a flip-flop array 602, a delay element array 604, a second flip-flop array 606 and comparison logic 608. The frequency sensor 600 may be used to test the clock frequency of a clock signal 610.

As illustrated in the diagram each flip-flop array 604, 606 may be clocked by the same clock signal 610. The flip-flop array 602 and the flip-flop array 606 may each be an array of a plurality of flip-flops. The delay element array 604 may include a plurality of delay elements. The frequency sensor 600 may generally be similar to the frequency sensor 200 of FIG. 2 and FIG. 4; however, the components are arrays of parallel devices. The array of flip-flop array 602 may clock multiple inputs at virtually the same time.

As illustrated in FIG. 6, the plurality of delay elements in delay element array 604 may include "short" delay elements, "medium" delay elements, and "long" delay elements. The length of these delay elements may generally be based on the desired clock period and the range of acceptable clock periods. Generally, each delay will be similar in length of time to one-half of the period of the clock. The delays of each of the delay elements in delay element 506 may vary in length, however. The plurality of delays may vary from a short delay to a medium delay to a long delay so that time of the, for example, rising edge of the clock may be determined.

As discussed above, the particular delays used for the short delay, the medium delay, and the long delay may depend on the acceptable variability of the clock signal. If the clock signal is to be very precise then it may be necessary for the differences in delays to be relatively small (based on the precision of the clock signal expected or the precision of the clock needed). In some examples, the delays may be very close to one-half of the clock period. Conversely, if a wide variety of clock frequencies are acceptable, then the differences in the delays may be larger. Generally, the delays from shortest to longest may be selected to span the particularly acceptable range of clock frequency, e.g., the shortest delay may be one-half the period of the lowest acceptable clock period, and the longest delay may be one-half the period of the highest acceptable clock period.

Furthermore, however, in some examples the range of delays may be greater than the range of acceptable clock periods. Additionally, in some examples, a greater number of delays, a lower number of delays, or an arrangement of delays that are further apart may be used. For example, a greater number of delays for a given span of frequencies may be used so that smaller differences in clock frequency and therefore clock period may be measured. The parallel delay line may be able to keep track of the clock period of the clock signal when the clock period is around the delay value.

In some examples, the delay line and/or the clock generator may be susceptible to variation due to changes in temperature. Accordingly, the output from the delay element array 604 may provide a thermal code output. In some examples, feedback may be used in order to overcome the issues described herein related to false passes as described herein. Additionally, some examples may use the falling edge of the clock.

Similar to the example of FIGS. 2 and 4, the example system of FIG. 5 may also be susceptible to false positives when a frequency over two times the desired clock frequency or more specifically over two times the highest desired clock frequency is used. For example, a false pass may occur if the period of the input clock is one-half of the delay value because sampling may occur on the previous clock edge.

Figure 7:
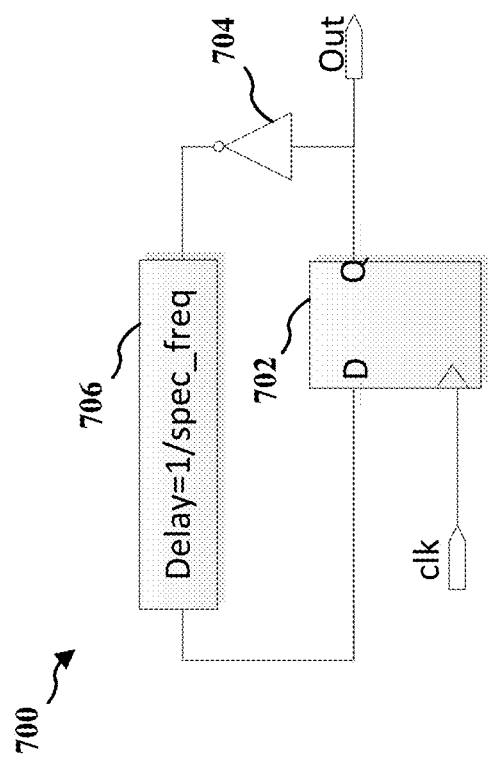
FIG. 7 is a circuit diagram illustrating a proposed frequency sensor implementation.

FIG. 7 is a circuit diagram illustrating a proposed frequency sensor 700 implementation. The proposed frequency sensor 700 includes a flip-flop 702, an inverter 704, and a delay circuit 706. The delay circuit 706 may have a delay equal to one divided by the specified frequency. The frequency to be in check by the frequency sensor 700 is the clock frequency on the clock input, CLK. The proposed frequency sensor 700 implements a clock divider. Depending on the frequency of the clock signal, CLK, the frequency sensor 700 may act as a two times clock divider, a four times clock divider, a six times clock divider, or a higher clock divider.

The proposed frequency sensor 700 may act as a two times clock divider when the period of the clock is greater than the delay of the delay element array 604. The proposed frequency sensor 700 may act as a four times clock divider when the clock period is less than the delay period of the delay element array 604 and the clock period of the delay element array 604 is less than two times the clock period of the clock. Generally, as the clock period increases, the clock divider will divide by greater and greater numbers.

The proposed frequency sensor 700 implementation of the example circuit of FIG. 7 introduces feedback to avoid false negative scenarios. The example frequency sensor 700 of FIG. 7 can be used to determine if the clock frequency is over a frequency limit by more than some integer ratio of the intended clock frequency. The example circuit of FIG. 7 implements a 2×/4×/6× (or greater) clock divider depending on the frequency of the clock signal being monitored. Other than a 2× clock division, all other division ratios, e.g., 4×, 6×, and so forth, indicate that the clock frequency is over the maximum specified frequency.

Figure 8:
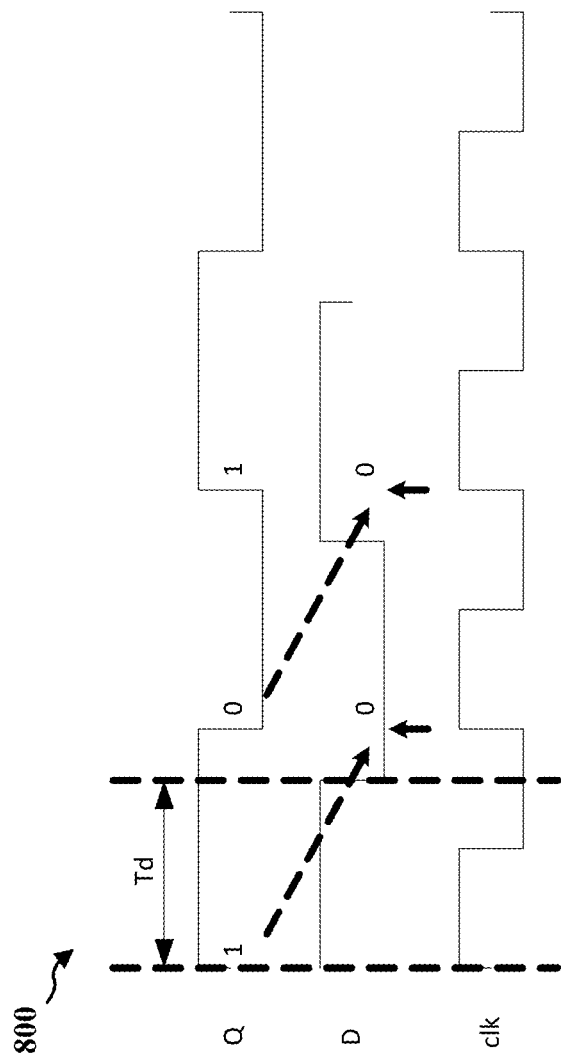
FIG. 8 is a timing diagram illustrating signals associated with the circuit of FIG. 7 when the circuit of FIG. 7 is functioning as a two times clock divider.

FIG. 8 is a timing diagram 800 illustrating signals in the circuit of FIG. 7 when the circuit of FIG. 7 is functioning as a two times clock divider. The circuit of FIG. 7 will now be discussed in further detail with respect to the timing diagram 800 of FIG. 8. The circuit of FIG. 7 may act as a two times clock divider when the delay of the delay circuit 706, Td, is less than the clock period of the clock on the D flip-flop 702, CLK.

As illustrated in FIG. 8, Td is less than the clock period, CLK. Accordingly, assuming that the clock, CLK, is active on a rising edge, the output, Q, of the D flip-flop 702 will change at the rising edge of the clock. (It will be understood, however, that in some implementations the negative edge of the flip-flop may be used as the active clock edge.) In the example of FIG. 8, the output of the flip-flop 702 will change once every rising clock edge due to the inverter and the timing of delay used. Accordingly, the output, Q, will have a frequency that is half the frequency of the clock, CLK.

Figure 9:
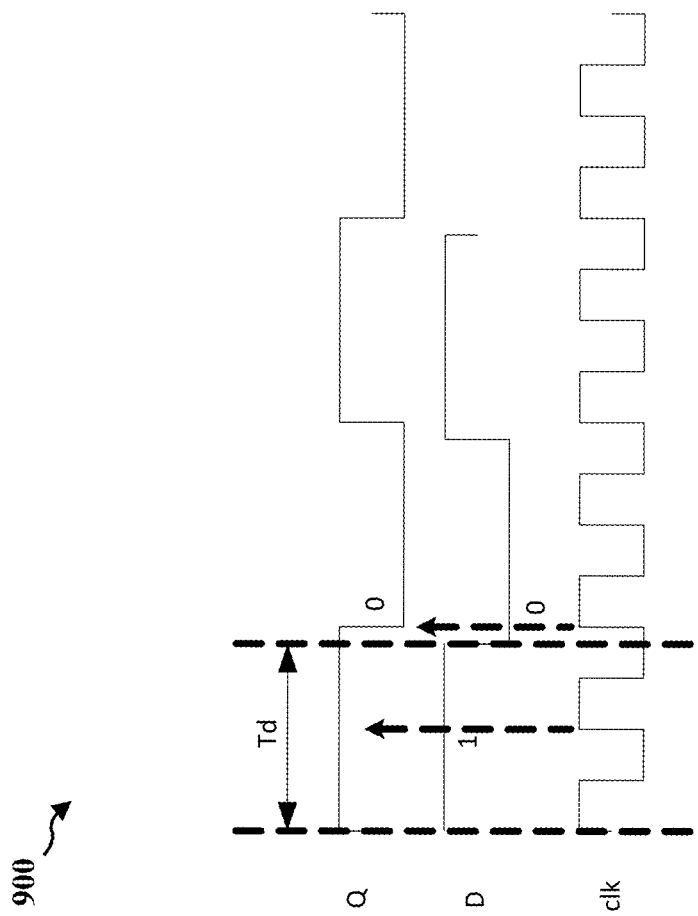
FIG. 9 illustrates a timing diagram illustrating signals associated with the circuit of FIG. 7 when the circuit of FIG. 7 is functioning as a four times clock divider.

FIG. 9 illustrates a timing diagram 900 that illustrates signal inputs and outputs of the circuit of FIG. 7 when the circuit of FIG. 7 is functioning as a four times clock divider. The circuit of FIG. 7 acts as a 4× clock divider when the period of the clock, Tclk, is less than the length of the delay of the delay circuit 706 of FIG. 7 and the delay of the delay circuit 706 is less than two times the period of the clock, Tclk. In other words, the circuit of FIG. 7 acts as a 4× clock divider when Tclk<Td<2*Tclk. For values of Td>2*Tclk the clock divider value, e.g., 6×, 8×, are implemented.

As illustrated in FIG. 9, when Td is greater than the period of the clock and less than two times the period of the clock, the output, Q, of the flip-flop 702 will have a period that is four times longer than the period of the clock. This occurs because the D input to the clock, CLK, will be clocked to the output of the D flip-flop 702 multiple times before the logical value on the output of the D flip-flop 702 is output from the delay circuit 706. In other words, the input of the D flip-flop 702 will remain the same for multiple clock cycles before the inverted value of the output of the D flip-flop 702 is output by the delay circuit 706. The delay may be just long enough for the inverted value from the inverter 704 to get fed back to the D input of the D flip-flop 702 after the second edge of the clock, CLK. Accordingly, the frequency of the output of the D flip-flop 702, Q, maybe four times the frequency of the clock, CLK. If the frequency of the clock, CLK, is increased such that Td>2*Tclk the number of clock cycles that occur before the signal changes on the input of the D flip-flop 702 increases such that, for values of Td>2*Tclk the clock divider value will increase, e.g., 6×, 8×, and so on, depending on the value of Tclk.

Figure 10:
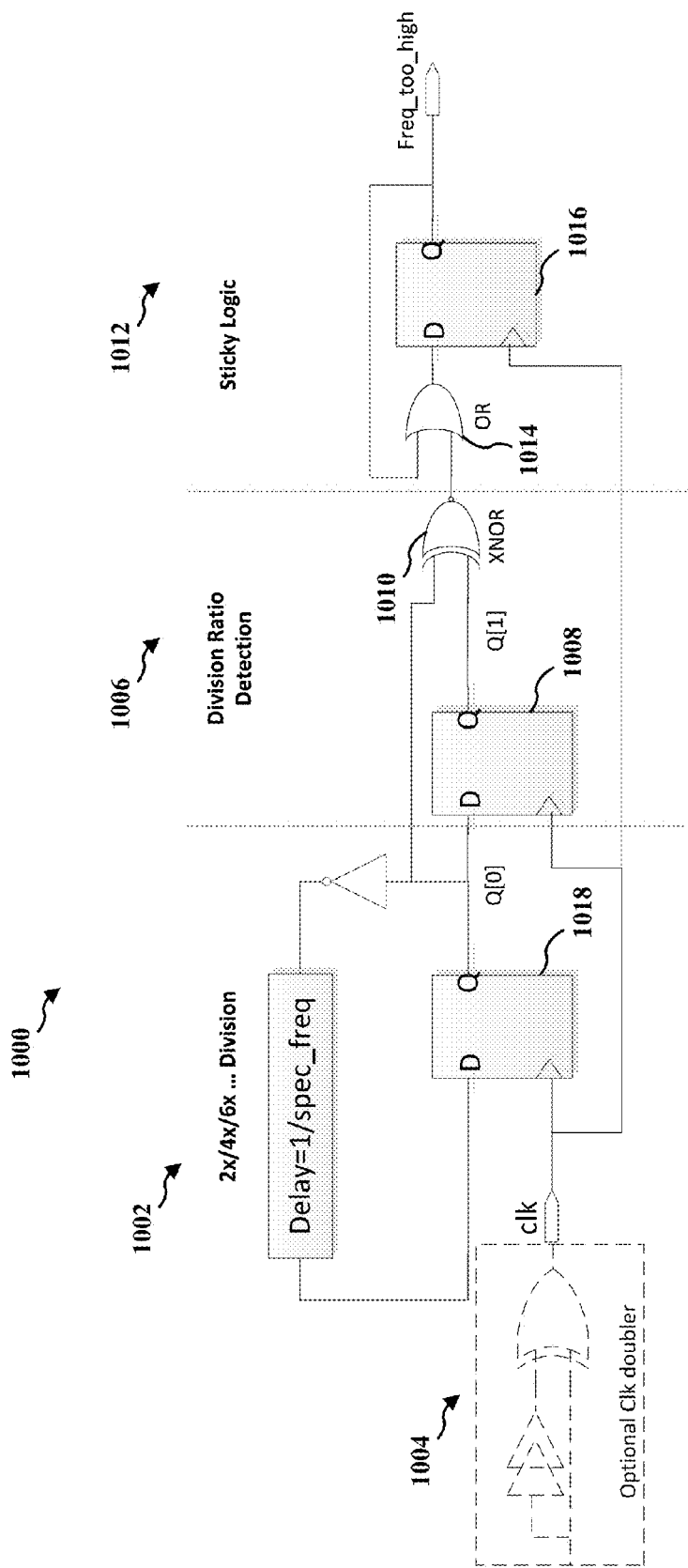
FIG. 10 is a circuit diagram illustrating one implementation that may use the circuit of FIG. 7 implements a frequency sensor for a clock that has a frequency that is too high.

FIG. 10 is a circuit diagram 1000 illustrating one implementation that may use the circuit of FIG. 7 to implement a frequency sensor 700 for a clock that has a frequency that is too high. The circuit of FIG. 7 illustrated in the circuit diagram of FIG. 10 is at 1002. As described above with respect to FIG. 7, the circuit 1002 may act as a 2×/4×/6× (and higher) divider. The circuit of FIG. 10 may include an optional clock doubler 1004. The optional clock doubler 1004 may double the frequency of the clock used in the rest of circuit diagram 1000. The delay value selected may be adjusted when the optional clock doubler 1004 is used. For example, the delay may be 1/specified frequency when the clock doubler is not used. The delay may be 1/(2*specified frequency) when the clock doubler is not used.

As illustrated in FIG. 10, a circuit diagram 1000 also includes division ratio detection circuitry 1006. The division ratio detection circuitry 1006 may include a D flip-flop 1008 and an XNOR 1010. The division ratio detection circuitry 1006 may be used to detect when a 4×/6× or greater division has occurred and/or is occurring as is discussed below in greater detail with respect to FIG. 11 and FIG. 12.

The circuit diagram 1000 of FIG. 10 also includes sticky logic 1012. The sticky logic includes an XOR gate 1010 and another D flip-flop 1016. The sticky logic 1012 may be used to hold a high signal if the division ratio detection circuitry 1006 ever detects a clock frequency that is greater than the desired clock frequency. Generally, the sticky logic 1012 may hold a high signal until it is reset. The reset signal for the D flip-flop 1016 is not shown.

Figure 11:
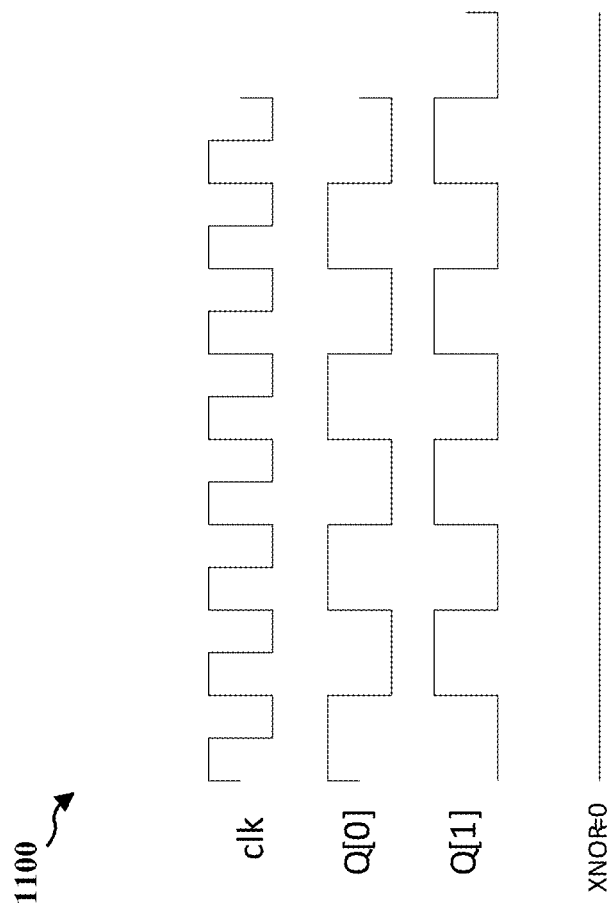
FIG. 11 is a timing diagram illustrating the functionality of the frequency sensor implementation of FIG. 10 when the clock frequency is lower than the specified frequency.

FIG. 11 is a timing diagram 1100 illustrating the functionality of the frequency sensor implementation of FIG. 10 when the clock frequency is lower than the specified frequency. FIG. 11 illustrates a clock signal, CLK, as well as various outputs of the circuit illustrated in FIG. 10. As illustrated in the timing diagram 1100, the output of the D flip-flop 1008, Q[0], is a 2× division of the clock, CLK. The 2× division of the clock is generated when the clock is less than the desired frequency, as discussed with respect to FIG. 7. The output of the D flip-flop 1016, Q[1], is a delay version of Q[0]. Accordingly, the logical values on the outputs of the D flip-flop 1008 and the D flip-flop 1018 are generally opposite values from each other. Some differences in the delay through the D flip-flops 1008 and 1018 may be present. Accordingly, some slight overlap may occur, but the outputs Q[0] and Q[1] will generally be opposite values at each rising clock edge. Thus, the output of the XNOR gate 1010 will remain a logic "0," as illustrated in FIG. 11.

Figure 12:
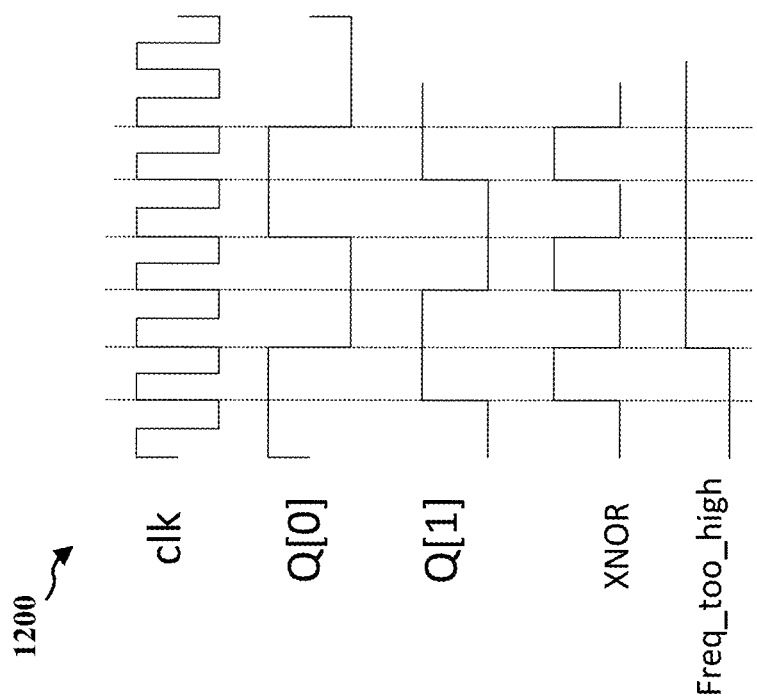
FIG. 12 is a timing diagram illustrating the functionality of the frequency sensor implementation of FIG. 10 when the clock frequency is higher than the specified frequency.

FIG. 12 is a timing diagram 1200 illustrating the functionality of the frequency sensor implementation of FIG. 10 when the clock frequency is higher than the specified frequency. FIG. 12 illustrates a clock signal, CLK, as well as various outputs of the circuit illustrated in FIG. 10. As illustrated in the timing diagram 1200, the output of the D flip-flop 1008, Q[0], has a lower frequency than a 2× division of the clock CLK. The lower frequency output, i.e., lower than the 2× division, is generated when the clock is greater than the desired frequency, as discussed with respect to FIG. 7. The output of the D flip-flop 1016, Q[1], is a delay version of Q[0], but the delay is not long enough to shift the signals on Q[0] and Q[1] such that they are 180° out of phase with each other. Rather, the Q[1] signal is shifted by one clock period. Accordingly, the logical values on the outputs of the D flip-flop 1008 and the D flip-flop 1018 are generally not opposite values from each other 100% of the time. Thus, the output of the XNOR gate 1010 will not remain a logic 0, as illustrated in FIG. 12. Rather, the XNOR 1010 will periodically be a logical "1" value. This logical "1" value will be held by the sticky logic 1012, as illustrated on the timing diagram 1200 by the signal "freq_too_high." The OR gate 1014 will be high when either the output of the XNOR gate 1010 is high (logic "1") or when the output of the D flip-flop 1016 is high. The output of the D flip-flop 1016 is fed back to the OR gate 1014 and thus, the logical "1" value (high) will be held in the D flip-flop 1016 until the D flip-flop 1016 is reset. (A reset signal for the D flip-flop 1016 is not illustrated in FIG. 10.)

Figure 13:
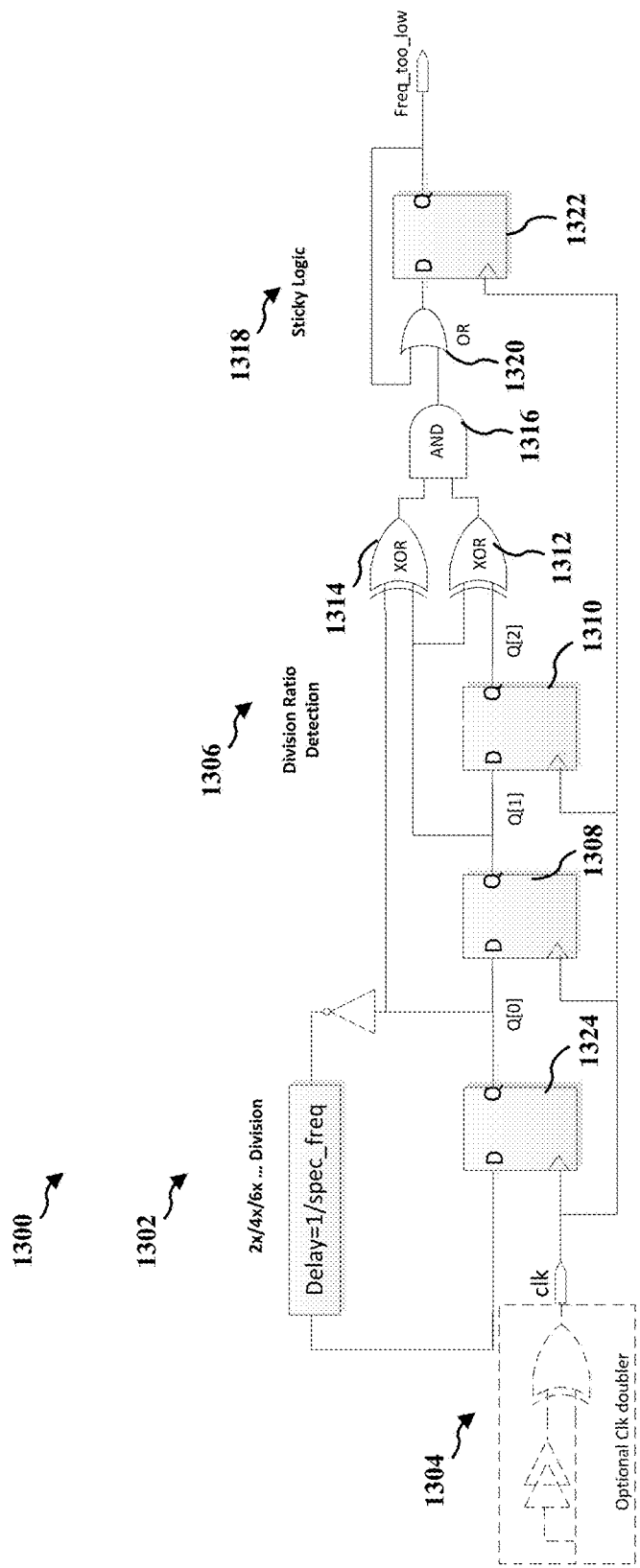
FIG. 13 is a circuit diagram illustrating an example frequency sensor implementation for determining if the clock has too low a frequency.

FIG. 13 is a circuit diagram 1300 illustrating an example frequency sensor implementation for determining if the clock has a frequency that is too low. The circuit diagram 1300 includes the example circuit of FIG. 7 at 1302. Additionally, the circuit diagram 1300 illustrates an optional clock doubler 1304.

The circuit diagram 1300 includes division ratio detection circuitry 1306. The division ratio detection circuitry includes D flip-flop 1308, D flip-flop 1310, XOR gate 1312, XOR gate 1314, and AND gate 1316. Furthermore, the circuit diagram 1300 includes sticky logic 1318. The sticky logic 1318 is generally similar to the sticky logic 1012 of FIG. 10.

Figure 14:
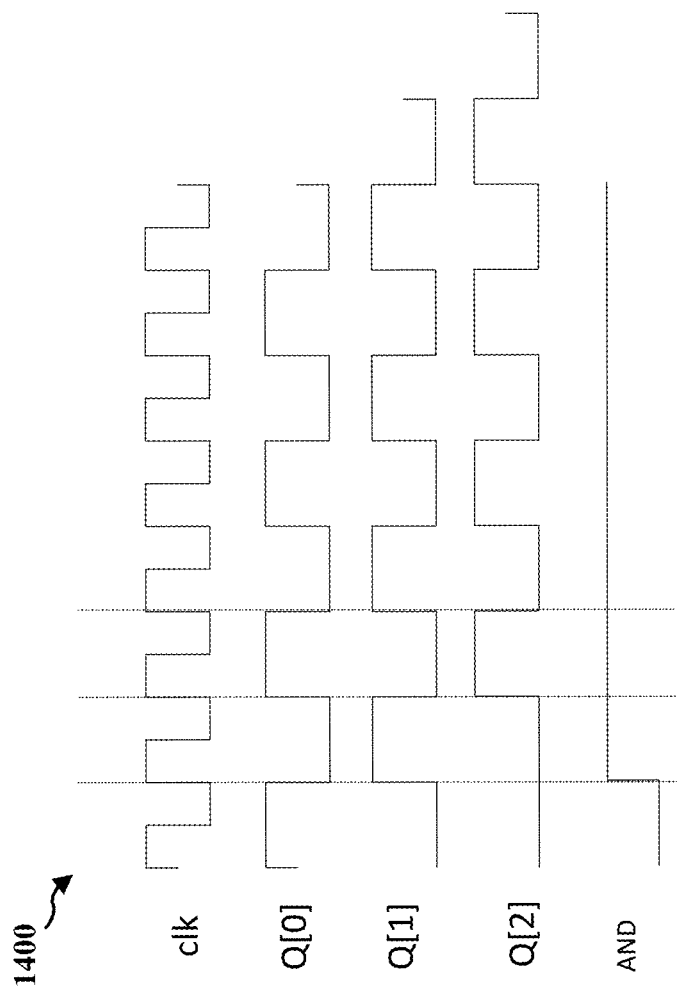
FIG. 14 is a timing diagram illustrating the functionality of the circuit of FIG. 13 when the clock frequency is lower than the specified frequency.

FIG. 14 is a timing diagram 1400 illustrating the functionality of the circuit of FIG. 13 when the clock frequency is lower than the specified frequency. When the clock frequency is lower than the specified frequency the circuit illustrated in FIG. 13 acts as a two times clock divider.

As illustrated in FIG. 14, the timing diagram 1400 includes a clock signal, CLK. The D flip-flop 1324 outputs a 2× divided clock signal when the clock frequency is lower than the specified frequency as described with respect to FIGS. 9-13. The D flip-flops 1308 and 1310 each delay the 2× divided clock signal. Accordingly, the timing diagram 1400 of FIG. 14 illustrates a first 2× divided clock signal Q[0], which is an output of the D flip-flop 1324. A delayed version of the divided clock signal, Q[0], is illustrated at Q[1]. A further delayed version of the divided clock signal, Q[2], which is the divided clock signal, Q[0], delayed by one clock period, is also illustrated in the timing diagram 1400 of FIG. 14. The XOR gates 1312, 1314 and the AND gate 1316 form a logic circuit for detecting that the clock frequency is lower than the specified frequency based on the existence of the 2× divided clock signal. As illustrated in the timing diagram 1400 of FIG. 14, the AND gate 1316 output will be a logical "1" when the frequency is lower than the specified frequency. Additionally, the output of the AND gate 1316 may be held using the sticky logic 1318, which includes D flip-flop 1322.

Figure 15:
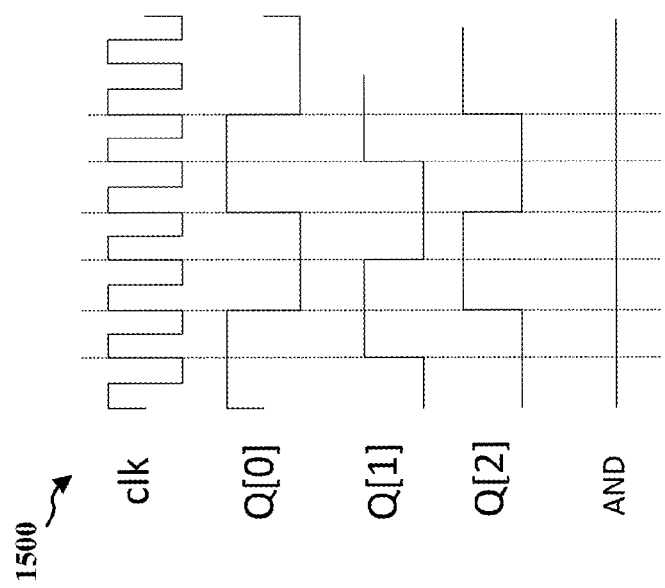
FIG. 15 is a timing diagram illustrating the functionality of the circuit of FIG. 13 when the clock frequency is higher than the specified frequency.

FIG. 15 is a timing diagram 1500 illustrating the functionality of the circuit of FIG. 13 when the clock frequency is higher than the specified frequency. When the clock frequency is higher than the specified frequency, the circuit of FIG. 13 acts as a 4× (or greater) clock divider.

As illustrated in FIG. 15, the timing diagram 1500 includes a clock signal, CLK. The D flip-flop 1324 may output a 4× divided clock signal as described with respect to FIG. 9. The D flip-flops 1308 and 1310 each delay the 4× divided clock signal. Accordingly, the timing diagram 1400 of FIG. 14 illustrates a first 4× divided clock signal, Q[0], which is an output of the D flip-flop 1324. A delayed version of the 4× divided clock signal is illustrated at Q[1]. A further delayed version of the 4× divided clock signal, Q[0], is illustrated at divided clock signal, Q[2]. The XOR gates 1312, 1314 and the AND gate 1316 detect that the clock frequency is higher than the specified frequency based on the existence of the 4× divided clock signal, which is detected by the division ratio detection circuitry 1306. As illustrated in the timing diagram 1500 of FIG. 15, the AND gate 1316 output will be a logical "0" when the frequency is higher than the specified frequency. The output of the AND gate 1316 may be a logic "0" and remain a logic "0." Accordingly, the sticky logic 1318, which includes D flip-flop 1322 will output a logic "0" (assuming a logic "1" value has not been captured since the last reset of the D flip-flop 1322). Accordingly, as described with respect to FIGS. 10-15, the circuitry illustrated in FIG. 9 may be used in frequency sensors to determine if a clock signal meets a particular clock frequency requirement. For example, the circuits of FIG. 10 and FIG. 13 may be used in conjunction to set a higher and lower end to a range of acceptable clock frequency values. Generally, these circuits do not generate false positive indications when the clock is, for example, double the desired clock frequency. Rather, these circuits may still generate frequency to high and frequency too low values for a clock with a clock frequency that is not within a desired range.

Figure 16:
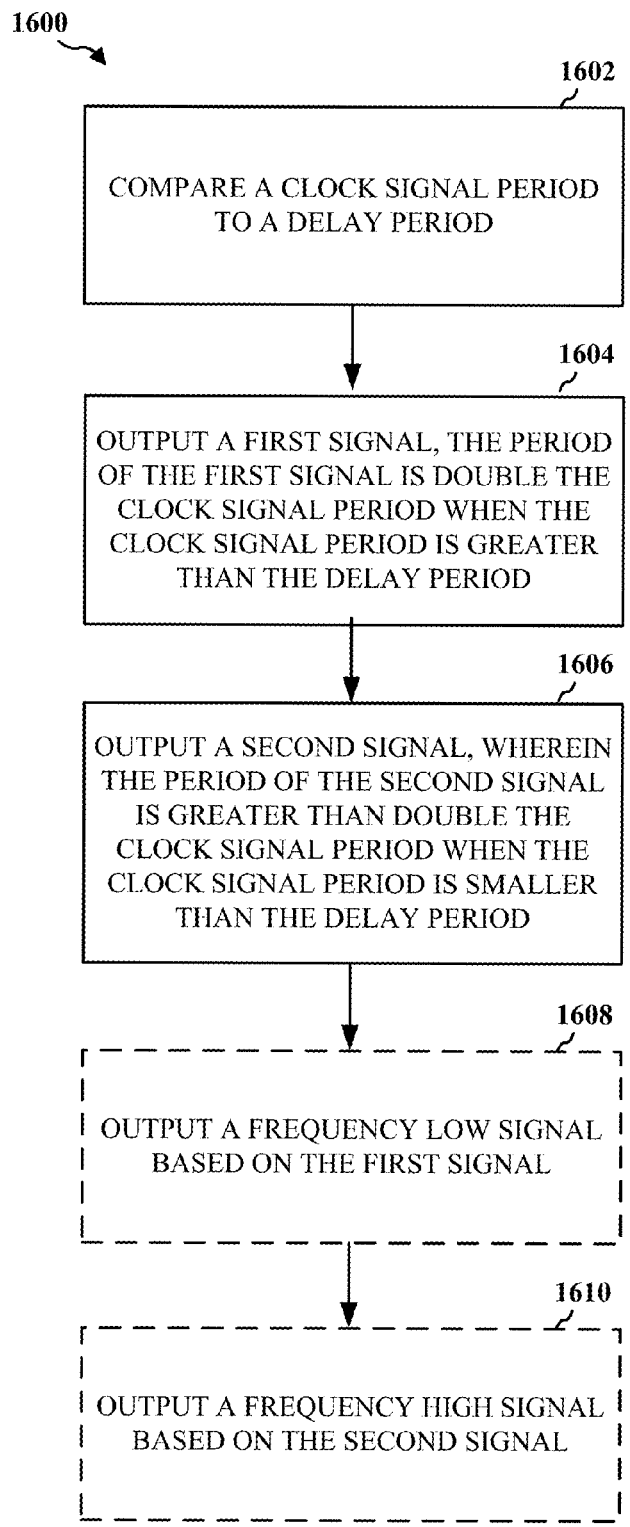
FIG. 16 is a flowchart illustrating an example method in accordance with the systems and methods described herein.

FIG. 16 is a flowchart 1600 illustrating an example method in accordance with the systems and methods described herein. Some examples described herein include methods for detecting an incorrect clock frequency. In a block 1602, circuitry such as the circuitry illustrated in FIG. 7, 10, or 13 may compare a clock signal period to a delay period. For example, the frequency sensor 700 of FIG. 7, the circuit 1002 of FIG. 10 in combination with the division ratio detection circuitry 1006 or the circuitry 1302 of FIG. 13 in combination with the division ratio detection circuitry 1306 may compare a clock signal period to a delay period.

In a block 1604, the circuit of FIG. 7, the circuitry 1002 of FIG. 10 or the circuitry 1302 of FIG. 13 may output a first signal. The period of the first signal may be double the clock signal period when the clock signal period is less than the delay period.

In a block 1606, the circuit of FIG. 7, the circuitry 1002 of FIG. 10 or the circuitry 1302 of FIG. 13 may output a second signal. The period of the second signal may be greater than double the clock signal period when the clock signal period is smaller than the delay period.

Some examples may output, on a single output, the first signal, when the clock signal period is greater than the delay period and outputting, on the single output, the second signal, when the clock signal period is smaller than the delay period. For example, the circuit of FIG. 7, the circuitry 1002 of FIG. 10 or the circuitry 1302 of FIG. 13 may output, on a single output, the first signal when the clock signal period is greater than the delay period and outputting, on the single output, the second signal when the clock signal period is smaller than the delay period.

In a block 1608, the circuitry 1002 of FIG. 10 may output a frequency low signal based on the first signal. Similarly, in a block 1610, the circuitry 1302 of FIG. 13 may output a frequency high signal based on the second signal. Generally, in some examples, the first signal may be output when the clock signal period is equal to the delay period.

Figure 17:
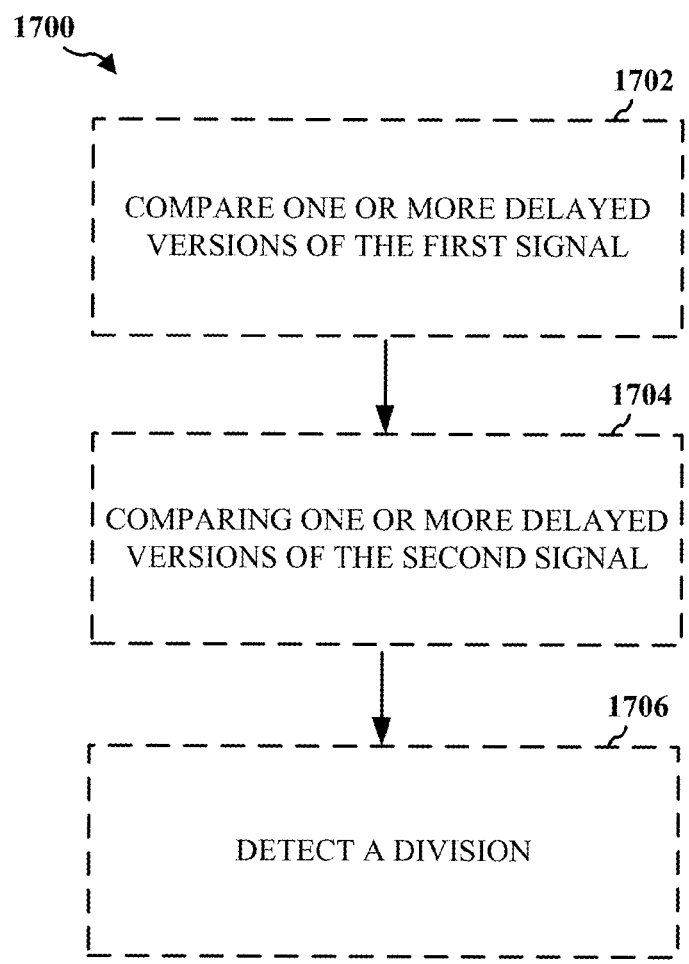
FIG. 17 is another flowchart illustrating an example method in accordance with the systems and methods described herein.

FIG. 17 is another flowchart illustrating an example method in accordance with the systems and methods described herein. In a block 1702, the division ratio detection circuitry 1006 may compare one or more delayed versions of the first signal. Each delayed version of the first signal may be delayed based on the clock signal. The frequency low signal may be based on one or more of the delayed versions of the first signal.

In a block 1704, the division ratio detection circuitry 1006, 1306 may compare one or more delayed versions of the second signal to generate the frequency high signal. The frequency high signal may be based on the comparison of one or more delayed versions of the second signal. Additionally, each delayed version of the second signal may be delayed based on the clock signal. In some examples, block 1702 and block 1704 may be performed in parallel.

In a block 1706, the division ratio detection circuitry 1006, 1306 may detect a division. The division may be generated using the circuitry described with respect to FIG. 7, which, as discussed above, is also included in the circuitry of FIG. 10 (1002) and FIG. 13 (1302). In some examples, block 1706 may be performed after block 1702 and block 1704 are performed. Additionally, as discussed above, block 1702 and block 1704 may be performed in parallel. Accordingly, block 1702 and block 1704 may be performed in parallel followed by block 1706, in some examples.

Figure 18:
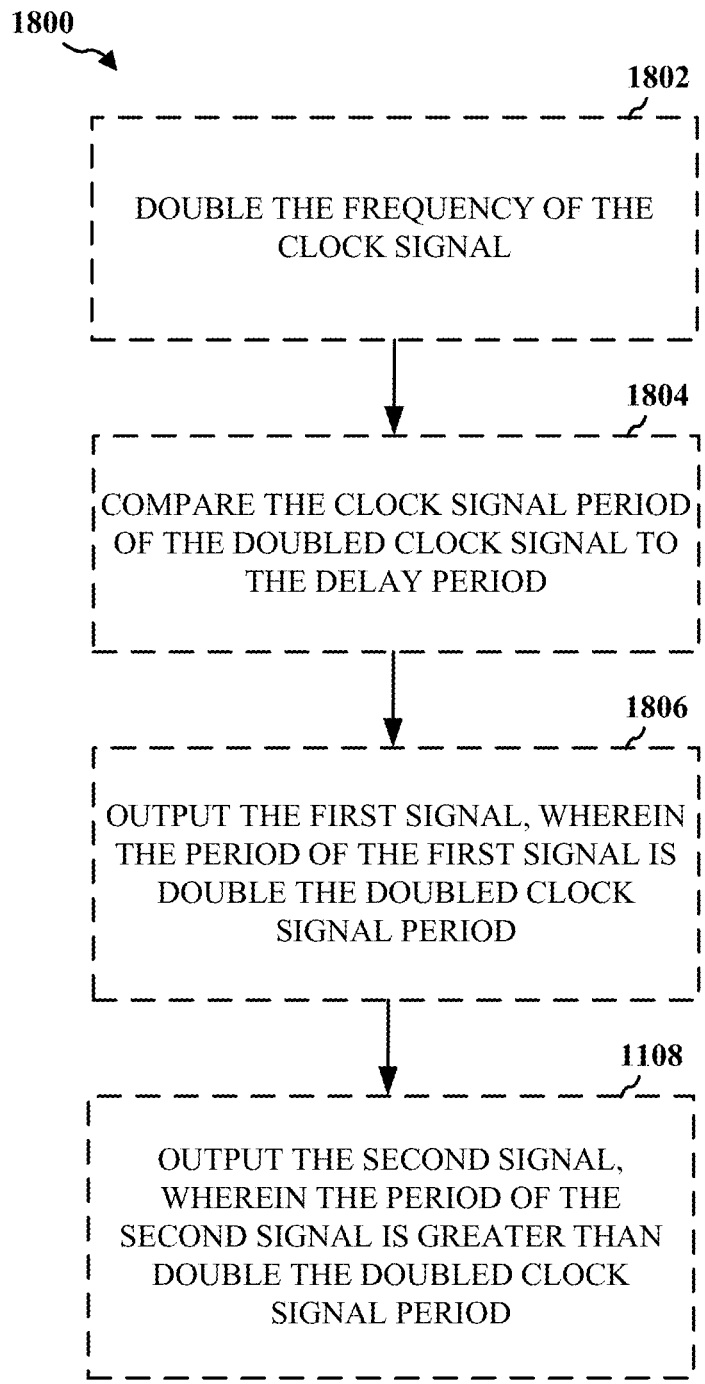
FIG. 18 is another flowchart illustrating an example method in accordance with the systems and methods described herein.

FIG. 18 is another flowchart illustrating an example method in accordance with the systems and methods described herein. In a block 1802, circuitry such as the circuitry illustrated in FIG. 7, the circuitry 1002 of FIG. 10, or the circuitry 1302 of FIG. 13 may double the frequency of the clock signal.

In a block 1804, the division ratio detection circuitry 1006, 1306 may compare the clock signal period of the doubled clock signal to the delay period. The division ratio detection circuitry 1006, 1306 may generally include logic circuitry to compare the outputs of the circuitry illustrated in FIG. 7 to determine if a clock frequency is within a desired range of frequencies.

In a block 1806, the circuitry illustrated in FIG. 7, the circuitry 1002 of FIG. 10, or the circuitry 1302 may output the first signal. The period of the first signal is double the doubled clock signal period when the doubled clock signal period is greater than the delay period.

In a block 1808, the circuitry illustrated in FIG. 7, the circuitry 1002 of FIG. 10, or the circuitry 1302 may output the second signal. The period of the second signal may be greater than double the doubled clock signal period when the doubled clock signal period is greater than the delay period.

The systems and apparatus described herein may include means for comparing a clock signal period to a delay period, such as the circuitry illustrated in FIG. 7, 10, or 13. For example, the circuit 1002 of FIG. 10 in combination with the division ratio detection circuitry 1006 or the circuitry 1302 of FIG. 13 in combination with the division ratio detection circuitry 1306 may compare a clock signal period to a delay period.

The systems and apparatus described herein may include means for outputting a first signal, such as the circuit of FIG. 7, the circuitry 1002 of FIG. 10 or the circuitry 1302 of FIG. 13. The period of the first signal may be double the clock signal period when the clock signal period is greater than the delay period.

The systems and apparatus described herein may include means for outputting a second signal, such as the circuit of FIG. 7, the circuitry 1002 of FIG. 10 or the circuitry 1302 of FIG. 13. The period of the second signal may be greater than double the clock signal period when the clock signal period is smaller than the delay period.

The systems and apparatus described herein may include means for outputting, on a single output, the first signal when the clock signal period is greater than the delay period and outputting, on the single output, the second signal when the clock signal period is smaller than the delay period. For example, the circuit of FIG. 7, the circuitry 1002 of FIG. 10 or the circuitry 1302 of FIG. 13 may output, on a single output, the first signal when the clock signal period is greater than the delay period and outputting, on the single output, the second signal when the clock signal period is smaller than the delay period.

The systems and apparatus described herein may include means for outputting a frequency low signal based on the first signal, such as the circuitry 1002 of FIG. 10. The systems and apparatus described herein may include means for outputting a frequency high signal based on the second signal, such as the circuitry 1302 of FIG. 13. Generally, in some examples, the first signal may be output when the clock signal period is equal to the delay period.

The systems and apparatus described herein may include means for comparing one or more delayed versions of the first signal, such as the division ratio detection circuitry 1006. Each delayed version of the first signal may be delayed based on the clock signal. The frequency low signal may be based on one or more of the delayed versions of the first signal.

The systems and apparatus described herein may include means for detecting a division, such as the division ratio detection circuitry 1006, 1306. The division may be generated using the circuitry described with respect to FIG. 7, which, as discussed above, is also included in the circuitry of FIG. 10 (1002) and FIG. 13 (1302).

The systems and apparatus described herein may include means for comparing one or more delayed versions of the second signal to generate the frequency high signal, such as the division ratio detection circuitry 1006, 1306. The frequency high signal may be based on the comparison of one or more delayed versions of the second signal. Additionally, each delayed version of the second signal may be delayed based on the clock signal.

The systems and apparatus described herein may include means for doubling the frequency of the clock signal, circuitry such as the circuitry illustrated in FIG. 7, the circuitry 1002 of FIG. 10, or the circuitry 1302 of FIG. 13.

The systems and apparatus described herein may include means for comparing the clock signal period of the doubled clock signal to the delay period, such as the division ratio detection circuitry 1006, 1306. The division ratio detection circuitry 1006, 1306 may generally include logic circuitry to compare the outputs of the circuitry illustrated in FIG. 7 to determine if a clock frequency is within a desired range of frequencies.

The systems and apparatus described herein may include means for outputting the first signal, such as the circuitry illustrated in FIG. 7, the circuitry 1002 of FIG. 10, or the circuitry 1302. The period of the first signal is double the doubled clock signal period when the doubled clock signal period is greater than the delay period.

The systems and apparatus described herein may include means for outputting the second signal, such as the circuitry illustrated in FIG. 7, the circuitry 1002 of FIG. 10, or the circuitry 1302. The period of the second signal may be greater than double the doubled clock signal period when the doubled clock signal period is smaller than the delay period.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for detecting an incorrect clock frequency, the apparatus comprising:
    a first circuit configured to compare a clock signal period to a delay period;
    a second circuit configured to output a first signal, wherein the period of the first signal is double the clock signal period when the clock signal period is greater than the delay period; and a third circuit configured to output a second signal, wherein the period of the second signal is greater than double the clock signal period when the clock signal period is less than the delay period.

2. The apparatus of claim 1, wherein the first circuit, the second circuit, and the third circuit comprise one combined circuit, the combined circuit comprising a frequency sensor circuit including a combination of a delay flip-flop, an inverter, and a delay circuit, an output of the delay flip-flop coupled to an input of the inverter, an output of the inverter coupled to the an input of the delay circuit, and an output of the delay circuit coupled to an input of the delay flip-flop.

3. The apparatus of claim 1, wherein the first signal and the second signal are both output on the same signal output of a circuit, the first signal output when the clock signal period is greater than the delay period and the second signal output when the clock signal period is less than the delay period.

4. The apparatus of claim 3, wherein the first signal is output when the clock signal period is equal to the delay period.

5. The apparatus of claim 1, further comprising a fourth circuit configured to provide a frequency low signal based on the first signal.

6. The apparatus of claim 5, wherein the fourth circuit comprises a division ratio detection circuit.

7. The apparatus of claim 5, wherein the frequency low signal is based on a comparison of one or more delayed versions of the first signal, each delayed version of the first signal delayed based on the clock signal.

8. The apparatus of claim 5, wherein the fourth circuit comprises a division ratio detection circuit.

9. The apparatus of claim 1, further comprising providing a frequency high signal based on the second signal.

10. The apparatus of claim 9, wherein the frequency high signal is based on a comparison of one or more delayed versions of the second signal, each delayed version of the second signal delayed based on the clock signal.

11. The apparatus of claim 10, further comprising a clock doubler configured to double the frequency of the clock signal, wherein:
the first circuit is further configured to compare the clock signal period of the doubled clock signal to a delay period,
the second circuit is further configured to output the first signal, wherein the period of the first signal is double the doubled clock signal period when the doubled clock signal period is greater than the delay period; and
the third circuit is further configured to output the second signal, wherein the period of the second signal is greater than double the doubled clock signal period when the doubled clock signal period is less than the delay period.

12. A method for detecting an incorrect clock frequency, the method comprising:
comparing a clock signal period to a delay period;
outputting a first signal, wherein the period of the first signal is double the clock signal period when the clock signal period is greater than the delay period; and
outputting a second signal, wherein the period of the second signal is greater than double the clock signal period when the clock signal period is less than the delay period.

13. The method of claim 12, outputting, on a single output, the first signal when the clock signal period is greater than the delay period and outputting, on the single output, the second signal when the clock signal period is less than the delay period.

14. The method of claim 13, wherein the first signal is output when the clock signal period is equal to the delay period.

15. The method of claim 12, further comprising outputting a frequency low signal based on the first signal.

16. The method of claim 15, further comprising comparing one or more delayed versions of the first signal, each delayed version of the first signal delayed based on the clock signal, the frequency low signal based on one or more of the delayed versions of the first signal.

17. The method of claim 16, further comprising detecting a division.

18. The method of claim 12, further comprising outputting a frequency high signal based on the second signal.

19. The method of claim 18, further comprising comparing one or more delayed versions of the second signal to generate the frequency high signal, the frequency high signal based on the comparison of one or more delayed versions of the second signal, each delayed version of the second signal delayed based on the clock signal.

20. The method of claim 19, further comprising:
doubling the frequency of the clock signal;
comparing the clock signal period of the doubled clock signal to the delay period;
outputting the first signal, wherein the period of the first signal is double the doubled clock signal period when the doubled clock signal period is greater than the delay period; and
outputting the second signal, wherein the period of the second signal is greater than double the doubled clock signal period when the doubled clock signal period is less than the delay period.

21. An apparatus for detecting an incorrect clock frequency, the apparatus comprising:
means for comparing a clock signal period to a delay period;
means for outputting a first signal, wherein the period of the first signal is double the clock signal period when the clock signal period is greater than the delay period; and
means for outputting a second signal, wherein the period of the second signal is greater than double the clock signal period when the clock signal period is less than the delay period.

22. The apparatus of claim 21, means for outputting, on a single output, the first signal when the clock signal period is greater than the delay period and outputting, on the single output, the second signal when the clock signal period is less than the delay period.

23. The apparatus of claim 22, wherein the first signal is output when the clock signal period is equal to the delay period.

24. The apparatus of claim 21, further comprising means for outputting a frequency low signal based on the first signal.

25. The apparatus of claim 24, further comprising means for comparing one or more delayed versions of the first signal, each delayed version of the first signal delayed based on the clock signal, the frequency low signal based on one or more of the delayed versions of the first signal.

26. The apparatus of claim 25, further comprising means for detecting a division ratio.

27. The apparatus of claim 21, further comprising means for outputting a frequency high signal based on the second signal.

28. The apparatus of claim 27, further comprising means for comparing one or more delayed versions of the second signal to generate the frequency high signal, the frequency high signal based on the comparison of one or more delayed versions of the second signal, each delayed version of the second signal delayed based on the clock signal.

29. The apparatus of claim 28, further comprising:
   means for doubling the frequency of the clock signal;
   means for comparing the clock signal period of the doubled clock signal to the delay period;
   means for outputting the first signal, wherein the period of the first signal is double the doubled clock signal period when the doubled clock signal period is greater than the delay period; and
   means for outputting the second signal, wherein the period of the second signal is greater than double the doubled clock signal period when the doubled clock signal period is less than the delay period.

\* \* \* \* \*